(12) United States Patent
Mackovitch

(10) Patent No.: US 10,838,944 B2
(45) Date of Patent: Nov. 17, 2020

(54) SYSTEM AND METHOD FOR MAINTAINING A MULTI-LEVEL DATA STRUCTURE

(71) Applicant: Apple Inc., Cupertino, CA (US)

(72) Inventor: Michael S. Mackovitch, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 970 days.

(21) Appl. No.: 15/379,429

(22) Filed: Dec. 14, 2016

(65) Prior Publication Data

US 2017/0357680 A1 Dec. 14, 2017

Related U.S. Application Data

(60) Provisional application No. 62/348,817, filed on Jun. 10, 2016.

(51) Int. Cl.
*G06F 16/23* (2019.01)
*G06F 16/22* (2019.01)

(52) U.S. Cl.
CPC .......... *G06F 16/23* (2019.01); *G06F 16/2246* (2019.01)

(58) Field of Classification Search
CPC ...................................................... G06F 16/23
See application file for complete search history.

(56) References Cited

U.S. PATENT DOCUMENTS

| | | | |
|---|---|---|---|
| 8,130,239 B1 | 3/2012 | Garrity | |
| 10,055,420 B1 * | 8/2018 | Pogde | ................. G06F 11/1448 |
| 2002/0188613 A1 | 12/2002 | Chakraborty et al. | |
| 2003/0204513 A1 | 10/2003 | Bumbulis | |
| 2013/0297613 A1 | 11/2013 | Yu | |
| 2014/0040199 A1 | 2/2014 | Golab et al. | |

\* cited by examiner

*Primary Examiner* — Van H Oberly
(74) *Attorney, Agent, or Firm* — Dickinson Wright RLLP

(57) ABSTRACT

Disclosed herein is a technique for merging a batch of intermediate trees into a base tree stored in a storage device. The batch of intermediate trees is stored in a storage device and each intermediate tree in the batch represents a tree that was previously moved from memory to the storage device. When the number of intermediate trees in the batch satisfies a threshold, the batch of intermediate trees is collectively merged into the base tree within the storage device.

20 Claims, 6 Drawing Sheets

FIRST INTERMEDIATE TREE 360

SECOND INTERMEDIATE TREE 362

BASE TREE 364

MERGE CHANGES TO BASE TREE

CHANGES TO RECORDS ASSOCIATED WITH "KEY B" FROM BOTH INTERMEDIATE TREES APPLIED TO BASE TREE AT THE SAME TIME

SYSTEM AND METHOD FOR MAINTAINING A MULTI-LEVEL DATA STRUCTURE

CROSS-REFERENCE TO RELATED APPLICATION

The present application claims the benefit of U.S. Provisional Application No. 62/348,817, entitled "SYSTEM AND METHOD FOR MAINTAINING A MULTI-LEVEL DATA STRUCTURE" filed Jun. 10, 2016, the content of which is incorporated herein by reference in its entirety for all purposes.

FIELD

The described embodiments set forth a technique for maintaining a multi-level data structure, where merges are performed as batch-wise updates to a base data structure.

BACKGROUND

A log-structured merge tree (also referred to as "LSM tree") maintains data in at least two tree structures, where a first tree structure is smaller than a second tree structure. When a number of write I/O operations causes the size of the first tree structure to exceed a particular threshold, the first true structure and second tree structure are merged together. The merge process involves performing a sequential scan of both the first tree structure and the second tree structure and creating a new tree that is larger than both the first tree structure and the second tree structure. Notably, the sequential scanning and writing of trees can take a significant amount of time. Additionally, a considerable number of write I/O operations need to be performed for creating the new larger tree, which can require write locks and cause disruption of user activities. Therefore, there is a need for a system avoids the significant cost of merge operations performed on LSM trees.

SUMMARY

Representative embodiments set forth herein disclose various techniques for maintaining multi-level tree data structures. In particular, the embodiments set forth various techniques for performing a batch-wise merge of a number of intermediate level trees into a base level tree. According to some embodiments, when the number of intermediate level trees stored in a storage device satisfies a particular threshold, the records associated with each of the intermediate level trees are collectively merged into a base level tree. Records of the base level tree are updated to reflect any changes made to the records associated with each of the intermediate level trees. Because the batch-wise merge process involves updating the base tree without having to write out/create an entirely new large tree (that would otherwise require a large number of write I/O operations), the merging of the trees can be accomplished in an efficient manner.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for merging a batch of intermediate trees into a base tree. Each intermediate tree in the batch of intermediate trees represents a tree that has been moved from a memory (e.g., a Random Access Memory (RAM)) to a storage device (e.g., a hard disk, a flash drive, etc.) when a size threshold associated with the tree has been satisfied. For example, a size threshold may be satisfied if a number of nodes included in the tree meets or exceeds a particular number. When the number of intermediate trees in the batch satisfies a threshold, the batch of intermediate trees is collectively merged into the base tree.

Accordingly, the techniques described herein provide a mechanism for batch-wise merging of trees. A more detailed discussion of these techniques is set forth below and described in conjunction with FIGS. 1-6, which illustrate detailed diagrams of systems and methods that can be used to implement these techniques.

Figure 1:
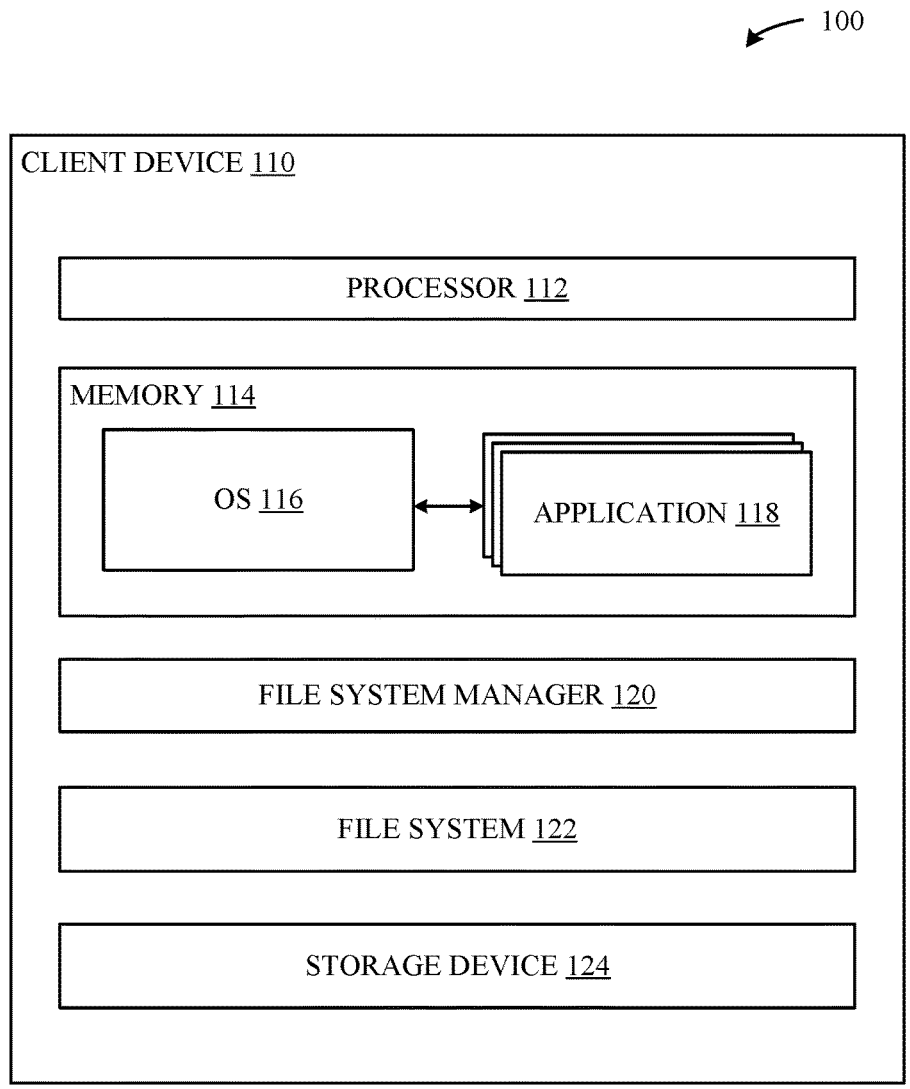
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a client device 110 that can represent a computing device (e.g., a smartphone device, a tablet device, a laptop computer, a desktop computer, etc.). A processor (e.g., a Central Processing Unit (CPU)) 112, in conjunction with the memory 114, can implement an operating system (OS) 116 configured to execute various applications 118 (e.g., native OS applications and user applications) and other processes/services on the client device 110.

According to some embodiments, the client device 110 includes a file system 122 that is utilized by the OS 116 to organize and keep track of files and directories on a storage device 124 (e.g., a disk or other storage device). According to some embodiments, the file system 122 can be implemented as a tree-based data structure (e.g., B-tree, or other tree-based structure). As described in greater detail herein, a file system manager 120 can be configured to receive input/output (I/O) requests (e.g., read and write I/O requests) for the files and manipulate the tree-based data structure in accordance with the I/O requests.

According to some embodiments, file system 122 maintains a first tree-based data structure (also referred to as an "in-memory tree") that is resident in memory 114 and a second tree-based data structure (also referred to as a "base tree" or "base level tree") that is resident in the storage device 124. In some implementations, the in-memory tree is considerably smaller in size than the base tree. In response to a first set of write I/O requests, file system manager 120 creates and/or updates the in-memory tree by inserting and/or updating file records associated with the requests in the in-memory tree. When the size of the in-memory tree, for example, a number of nodes included in the in-memory tree, exceeds a particular size threshold, (1) the in-memory tree is moved from the memory 114 to the storage device 124 (e.g., the in-memory tree is copied from the memory 114 to the storage device 124, and then deleted from the memory 114, or the in-memory tree is "streamed" from the memory 114 to the storage device 124 (e.g., the tree is partitioned into segments, and each segment is sequentially copied over to the storage device 124 and deleted from the memory 114)), and (2) a new empty in-memory tree is created in the memory 114. At this point, the storage device 124 includes the base tree and the moved in-memory tree (also referred to as "first intermediate tree" or "first intermediate level tree"). When a second set of write I/O requests cause the size of the new in-memory tree to exceed the particular size threshold, (1) the new in-memory tree is moved from the memory 114 to the storage device 124, and (2) yet another empty in-memory tree is created in memory 114. At this point, the storage device 124 includes the base tree, the first intermediate tree that was previously moved to the storage device 124, and the currently moved in-memory tree (as referred to as "second intermediate tree" or "second intermediate level tree"). The process of creating the in-memory tree and moving the in-memory tree to the storage device 124 (when the size of the in-memory tree exceeds the particular size threshold) is iteratively performed until a number of intermediate trees in the storage device 124 satisfy a particular threshold. When the particular threshold is satisfied, the number of intermediate trees are batch-merged into the base tree.

Figure 2:
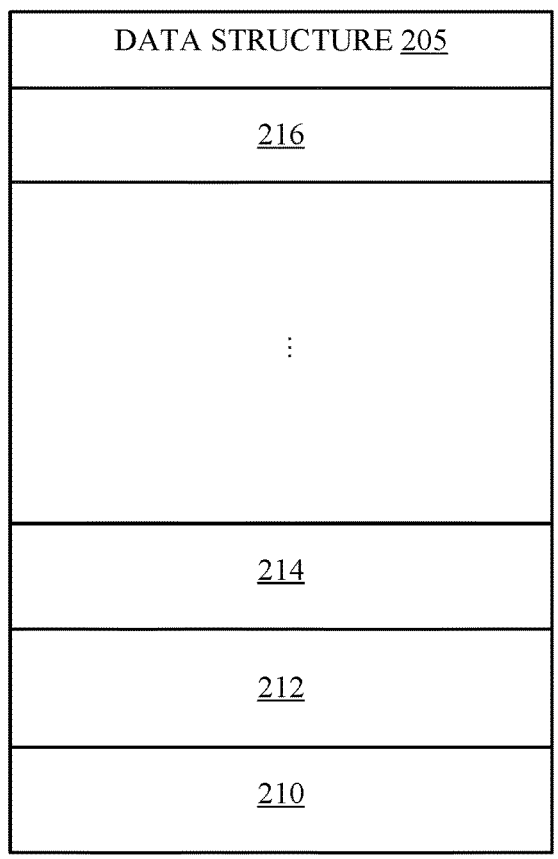
FIG. 2 illustrates a conceptual diagram of a data structure used by a file system of the client device of FIG. 1, according to some embodiments.

FIG. 2 illustrates a conceptual diagram 200 of a data structure 205 maintained by the file system 122 to track the various trees, according to some embodiments. According to some embodiments, a lowermost layer 210 of the data structure 205 contains a pointer to the base tree. A topmost layer 216 of the data structure 205 contains a pointer to the in-memory tree (i.e., the tree that is currently resident in memory 114). Layers 212 and 214—which lie between the lowermost layer 210 and the topmost layer 216—can contain pointers to the intermediate trees. For example, layer 212 can contain a pointer to the first intermediate tree and layer 214 can contain a pointer to the second intermediate tree. The layers 212, 214 can be added on top of the lowermost layer 210 when the corresponding intermediate trees are moved to the storage device 124. In some implementations, the file system manager 120 utilizes the data structure 205 to access the various trees. For example, when the file system manager 120 receives a write I/O request, the file system manager 120 accesses the data structure 205 and locates the in-memory tree by following the pointer stored in the topmost layer 216 of the data structure 205.

Figure 3:
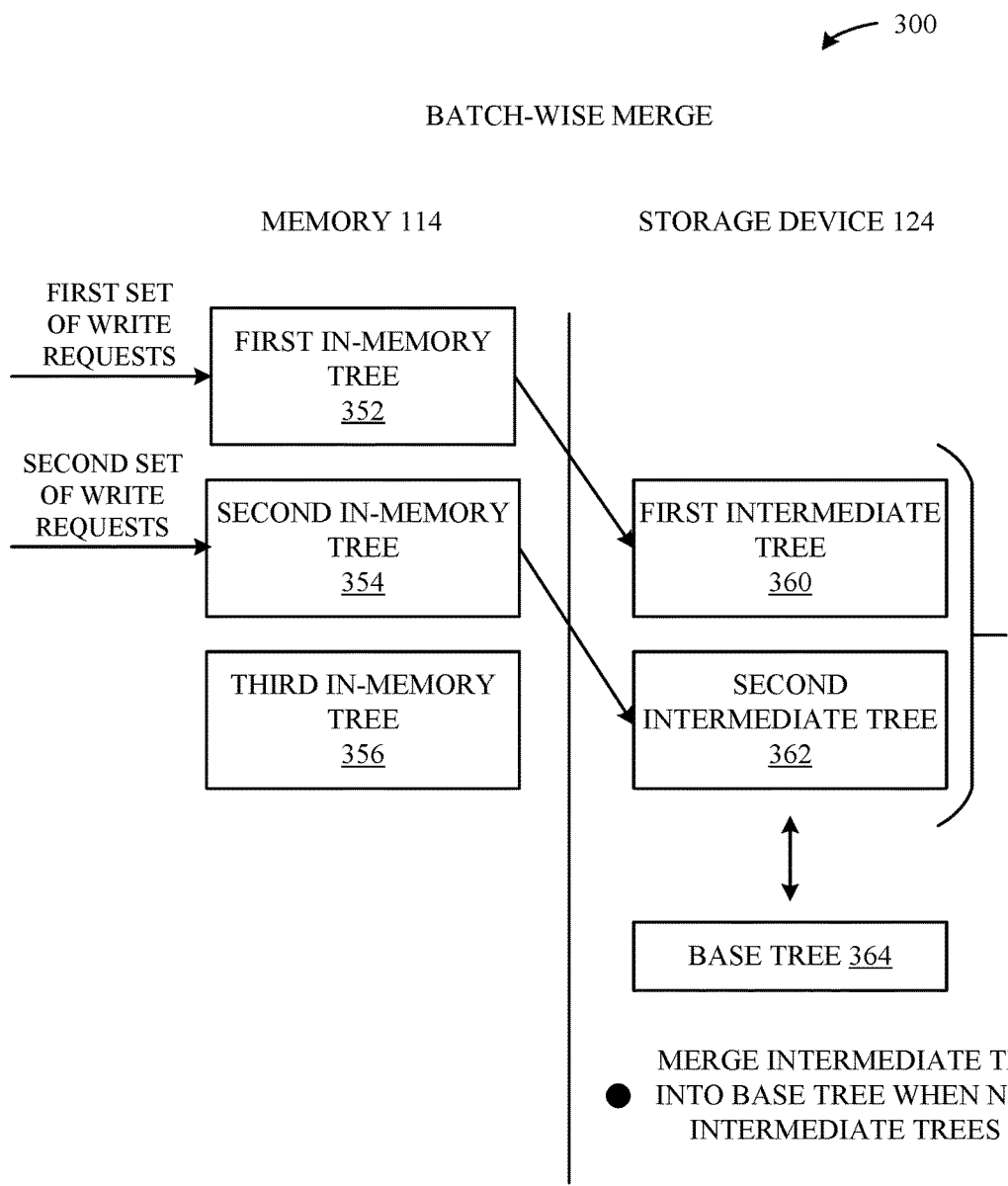
FIG. 3 illustrates a conceptual diagram of merge process performed at the client device of FIG. 1, according to some embodiments.

FIG. 3 illustrates a conceptual diagram 300 of a batch-wise merge process being performed by the file system manager 120, according to some embodiments. As shown in FIG. 3, the file system manager 120 receives a first set of write I/O requests associated with a first set of file records and updates a first in-memory tree 352 in accordance with the requests. The file system manager 120 updates the nodes of the first in-memory tree 352 that correspond to the first set of file records. When the size of the first in-memory tree exceeds a particular size threshold, the file system manager 120 (1) moves the first in-memory tree 352 from the memory 114 to the storage device 124 (where it is represented as the first intermediate tree 360 that records any changes associated with the first set of file records), and (2) creates a second in-memory tree 354 in memory 114. The file system manager 120 then receives a second set of write I/O requests associated with a second set of file records and updates the second in-memory tree 354 in accordance with the requests. The file system manager 120 updates the nodes of the second in-memory tree 354 that correspond to the second set of file records. When the size of the second in-memory tree 354 exceeds the particular size threshold, the file system manager 120 (1) moves the second in-memory tree 354 from the memory 114 to the storage device 124 (where it is represented as the second intermediate tree 362 that records any changes associated with the second set of file records), and (2) creates a third in-memory tree 356 in memory 114 to accept any changes that result from further write I/O requests. In this manner, the file system manager 120 tracks a number of intermediate trees (e.g., 360, 362) that reside in the storage device 124. When the number of intermediate trees in the storage device 124 satisfies a particular threshold, the intermediate trees are collectively merged into a base tree 364 as a batch. For example, FIG. 3 depicts that the first intermediate tree 360 and the second intermediate tree 362 are merged into the base tree 364 when the threshold is satisfied (e.g., there are two intermediate trees).

According to some embodiments, the batch-wise merging technique involves, for a particular record in the base tree, (1) iterating through the keys in order in each of the intermediate trees in parallel, (2) combining the records for each key in the intermediate trees to generate an updated record, and (3) updating the particular record in the base tree with the updated record. In some implementations, the particular record can be removed from the base tree when the updates in the intermediate trees involve deleting the particular record.

Figure 4:
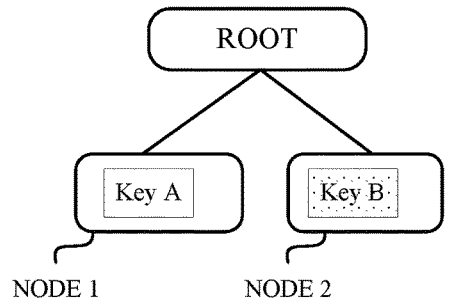
FIG. 4 illustrates a conceptual diagram of intermediate and base trees associated with a file system of the client device of FIG. 1, according to some embodiments.
Figure 4:
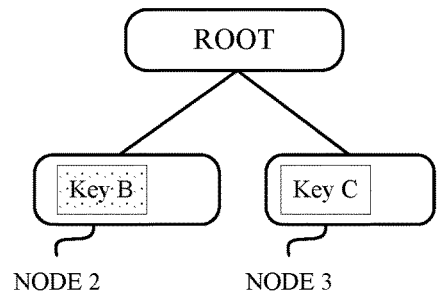
Figure 4:
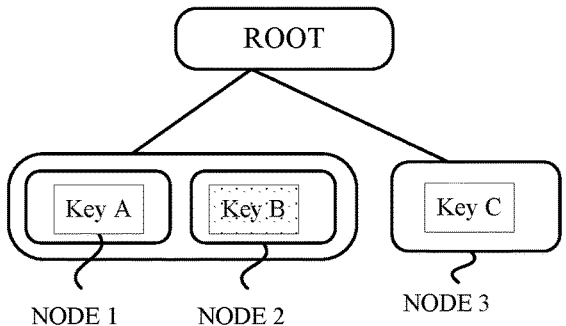

According to some embodiments, the records of the base tree 364 (associated with leaf nodes or other nodes of the base tree 364) are updated to reflect any changes that are recorded in the first intermediate tree 360 and the second intermediate tree 362. The intermediate trees can record changes made to the same records or to records that exist in the same leaf nodes in the base tree, although these changes may temporally not be performed at the same time. For example, FIG. 4 illustrates a conceptual diagram 400 that depicts the first intermediate tree 360 including a Node 1 and a Node 2 and the second intermediate tree 362 including a Node 2 and a Node 3. The first intermediate tree 360 can record changes made to records associated with keys in Node 1 and Node 2 (e.g., Key A in Node 1 and Key B in Node 2). The second intermediate tree 362 can record changes made to records associated with keys in Node 2 and Node 3 (e.g., Key B in Node 2 and Key C in Node 3). When the first intermediate tree 360 and the second intermediate tree 362 are merged into the base tree 364, the changes recorded in records associated with Keys A, B, and C are applied to the corresponding records of the base tree 364. In particular, the changes recorded in records associated with Key B (from the first intermediate tree 360 and the second intermediate tree 362) can be combined and applied to the base tree 364 at the same time without requiring the corresponding record of the base tree 364 to be accessed twice.

It is noted that while two intermediate trees are depicted in FIGS. 3 and 4, more than two intermediate trees can also be utilized when the threshold is greater than two, as will be appreciated. Moreover, the tree structures depicted in FIGS. 3 and 4 are exemplary and any other tree structures with a different order or number of nodes can be utilized without departing from the scope of this disclosure.

According to some embodiments, the size of the intermediate trees is controlled in a manner that helps expedite lookup requests. For example, the size threshold can be set in a manner that helps keep the size of the intermediate trees manageable. Moreover, it is noted that the intermediate trees do not change due to the fact that record updates (performed in response to write I/O requests) are directed to the in-memory tree rather than the intermediate trees. Instead, the intermediate trees are only accessed in response to record lookups (performed in response to read I/O requests). Thus, no exclusive write locks are needed for the intermediate trees.

According to some embodiments, the intermediate trees can be incrementally merged into the base tree. A lookup request for a particular record can be performed while the merge process is being carried out. In response to the lookup request, the particular record is located in one of the intermediate trees while the merge process is in progress. After the lookup request is completed, the merge process is restarted. In some implementations, when a lookup request for the particular record is received, the file system manager 120 performs the lookup in the in-memory tree and the intermediate trees regardless of whether the intermediate trees have been merged into the base tree. In some implementations, the intermediate trees are not deleted from the storage device 124 until all the associated records have been written into the base tree (i.e., until the merge process is complete).

Figure 5:
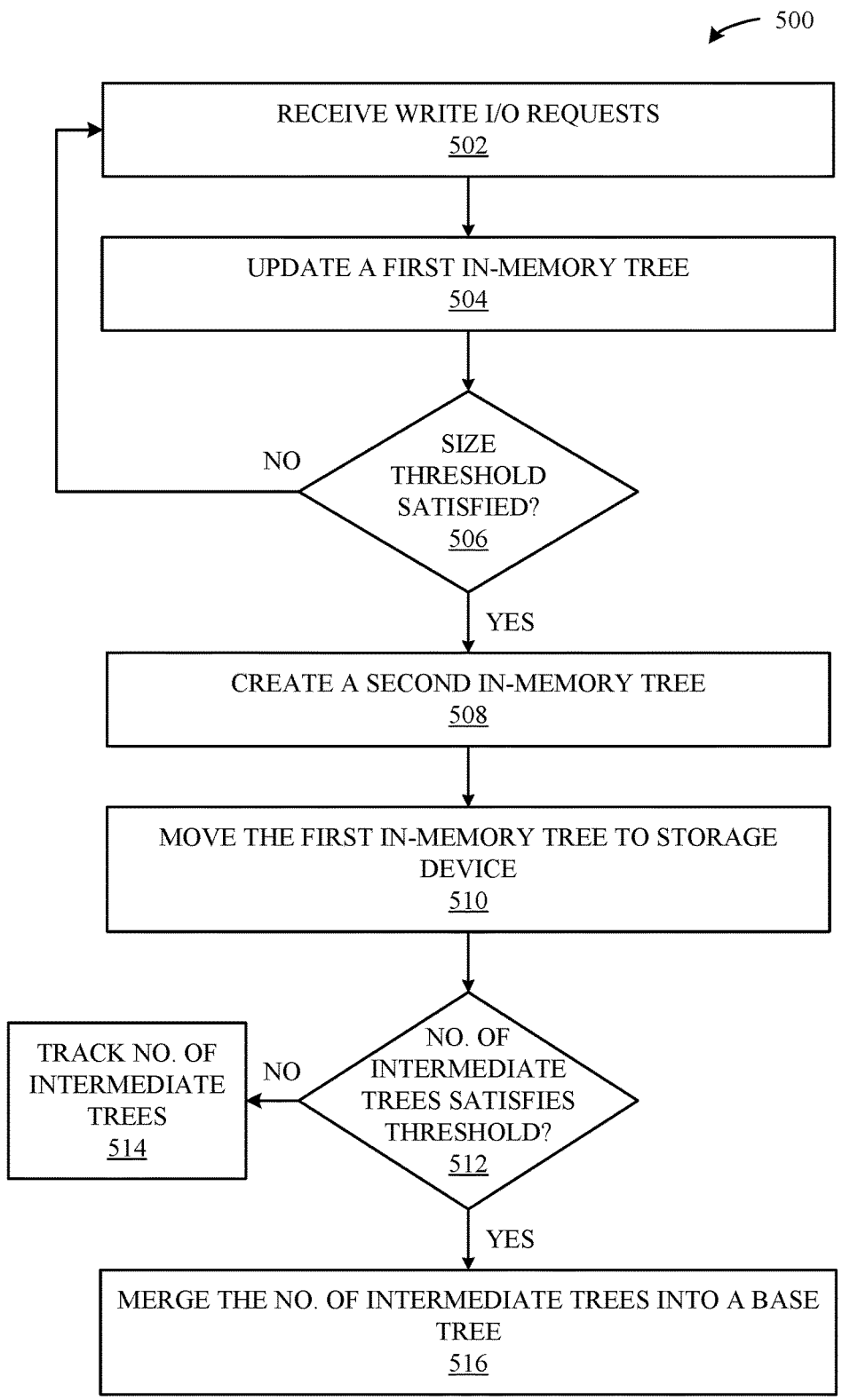
FIG. 5 illustrates a method that is carried out at the client device of FIG. 1, according to some embodiments.

FIG. 5 illustrates a method 500 that is carried out by the file system manager 120 operating at the client device 110 of FIG. 1, according to some embodiments. As shown in FIG. 5, the method 500 begins at step 502, where the file system manager 120 receives write I/O requests. At step 504, the file system manager 120 updates a first in-memory tree in accordance with the requests. At step 506, the file system manager 120 determines whether the size of the in-memory tree satisfies a size threshold. When the size threshold is not satisfied, the process returns to step 502, where additional write I/O requests can be received and processed.

Alternatively, when the size threshold is satisfied at step 506, the file system manager 120 (1) creates a second in-memory tree in the memory 114 at step 508, and (2) moves the first in-memory tree from the memory 114 to the storage device 124 at step 510. The moved in-memory tree represents a first intermediate tree that is stored in the storage device 124. Steps 502-510 can be performed iteratively until a number of intermediate trees stored in the storage device satisfies a threshold. In particular, at step 512, the file system manager 120 determines whether the number of intermediate trees satisfies a threshold. When the threshold is not satisfied, the file system manager 120 continues to keep track of the number of intermediate trees until number of trees satisfies the threshold (at step 514), when the threshold is satisfied, the file system manager 120 collectively merges the intermediate trees into a base tree at step 516.

In this manner, a technique for maintaining a multi-level data structure (including a number of intermediate level trees and the base level tree) is described, where the intermediate level trees are batch-wise merged into the base level tree. This is in contrast to the merging techniques for LSM trees that do not utilize a base tree and perform merges by combining adjacent trees to form a completely new tree. It is noted that the techniques described herein can be used for a multi-level data structure that includes other types of data structures (i.e., other than trees) for each level, as will be appreciated.

While the various embodiments herein discuss the batch-wise merging of trees associated with a file system, the disclosure is not so limited. Instead, the merging techniques disclosed herein can be applied to any system that uses tree data structures or similar data structures. For example, the merging technique can be utilized for trees that maintain block references or snapshots. Also, queues that track free blocks (i.e., blocks that can be made available for reuse) can be implemented as trees and the merging technique can be applied to these trees. Moreover, the merging techniques described herein are not limited to utilization of the storage device 124 and the memory 114, but can be implemented with two different levels of storage, e.g., cache and RAM.

Figure 6:
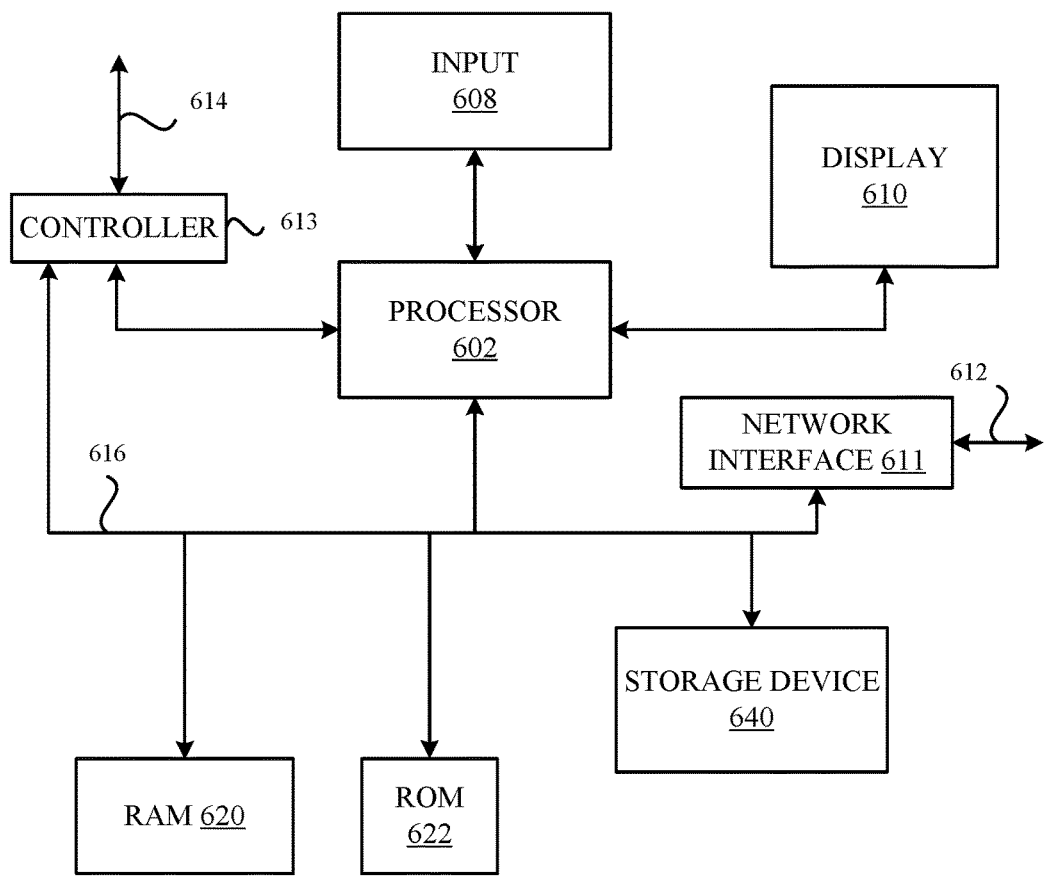
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the client device 110 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

EMBODIMENTS

The embodiments set forth a method for maintaining a multi-level tree data structure. According to some embodiments, the method includes the steps of: (1) moving a plurality of in-memory trees that are resident in a memory of a client device to a storage device, (2) determining whether a number of intermediate level trees resident in the storage device satisfies a threshold, wherein each intermediate level tree in the number of intermediate level trees corresponds to an in-memory tree of the plurality of in-memory trees, and (3) in response to a determination that the number of intermediate level trees satisfies the threshold: merging the number of intermediate level trees collectively into a base level tree that is resident in the storage device.

In some embodiments, each in-memory tree of the plurality of in-memory trees is moved to the storage device when a size of the in-memory tree satisfies a size threshold. In some embodiments, the steps further include: receiving a set of write input/output (I/O) requests, and updating an in-memory tree of the plurality of in-memory trees in accordance with the set of write I/O requests. In some embodiments, the steps further include, when a size of the in-memory tree satisfies the size threshold: moving the in-memory tree to the storage device, and creating a second in-memory tree in the memory. Moreover, in some embodiments, the steps of receiving, updating, moving, and creating are iteratively performed until the number of intermediate level trees stored in the storage device satisfies the threshold.

Additionally, and in some embodiments, the steps further include, in response to a determination that the number of intermediate level trees does not satisfy the threshold: tracking the number of intermediate level trees until the number of intermediate level trees satisfies the threshold. In some embodiments, merging the number of intermediate level trees collectively into the base level tree further comprises: updating one or more records in the base level tree in accordance with one or more changes recorded in the one or more records associated with each intermediate level tree of the number of intermediate level trees. Additionally, in some embodiments, the steps further include: receiving a lookup request for a particular record, and searching the number of intermediate level trees to obtain the particular record.

It is noted that the foregoing method steps can be implemented in any order, and that different dependencies can exist among the various limitations associated with the method steps.

The embodiments additionally set forth a computing device comprising a processor and a memory device configured to store: an in-memory tree, and instructions that, when executed by the processor, cause the computing device to perform steps that include: (1) updating the in-memory tree in accordance with one or more write input/output (I/O) requests, (2) when a size of the in-memory tree satisfies a size threshold: moving the in-memory tree to a storage device, and creating a new in-memory tree in the memory device, and (3) performing the updating, the moving, and the creating steps iteratively until a number of intermediate trees satisfies a threshold, wherein each intermediate tree in the number of intermediate trees represents the in-memory tree that is moved to the storage device.

Additionally, in some embodiments, the steps further include: determining whether the number of intermediate trees in the storage device satisfies a threshold. Additionally, in some embodiments, the steps further include, in response to a determination that the number of intermediate trees satisfies the threshold: merging the number of intermediate trees collectively into a base tree that is resident in the storage device. In some embodiments, merging the number of intermediate trees collectively into the base tree further comprises: updating one or more records in the base tree in accordance with one or more changes recorded in the one or more records associated with each intermediate tree of the number of intermediate trees. Additionally, in some embodiments, the steps further include: receiving a lookup request for a particular record; and searching the number of intermediate trees to obtain the particular record.

It is noted that the foregoing steps can be implemented in any order, and that different dependencies can exist among the various limitations associated with the steps.

The embodiments additionally set forth a non-transitory computer readable medium configured to store instructions that, when executed by a processor of a computing device, cause the computing device to perform steps that include: (1) moving a plurality of in-memory trees that are resident in a memory of a client device to a storage device, (2) determining whether a number of intermediate trees resident in the storage device satisfies a threshold, wherein each intermediate tree in the number of intermediate trees corresponds to an in-memory tree of the plurality of in-memory trees, and (3) in response to a determination that the number of intermediate trees satisfies the threshold: merging the number of intermediate trees collectively into a base tree that is resident in the storage device.

In some embodiments, each in-memory tree of the plurality of in-memory trees is moved to the storage device when a size of the in-memory tree satisfies a size threshold. Additionally, in some embodiments, the steps further include: receiving a set of write input/output requests, and updating an in-memory tree of the plurality of in-memory trees in accordance with the set of write I/O requests. Additionally, in some embodiments, the steps further include, when a size of the in-memory tree satisfies the size threshold: moving the in-memory tree to the storage device, and creating a second in-memory tree in the memory. In some embodiments, the steps of receiving, updating, moving, and creating are iteratively performed until the number of intermediate trees stored in the storage device satisfies the threshold. In some embodiments, merging the number of intermediate trees collectively into the base tree further comprises: updating one or more records in the base tree in accordance with one or more changes recorded in the one or more records associated with each intermediate tree of the number of intermediate trees. Additionally, in some embodiments, the steps further include: receiving a lookup request for a particular record, and searching the number of intermediate trees to obtain the particular record.

It is noted that the foregoing steps can be implemented in any order, and that different dependencies can exist among the various limitations associated with the steps.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for merging one or more intermediate trees with a base tree, the method comprising, at a computing device:
    managing a first intermediate tree that is stored in a volatile memory with which the computing device is communicably coupled;
    in response to determining that the first intermediate tree satisfies a first size threshold:
        copying the first intermediate tree from the volatile memory to a non-volatile memory with which the computing device is communicably coupled, wherein the non-volatile memory:
            stores at least one intermediate tree that includes at least the first intermediate tree, and
            stores the base tree; and
    in response to determining that the of at least one intermediate tree satisfies a second size threshold:
        merging the at least one intermediate tree with the base tree.

2. The method of claim 1, wherein the first intermediate tree satisfies the first size threshold when a size of the first intermediate tree matches or exceeds the first size threshold.

3. The method of claim 1, wherein the steps further include:
    receiving a set of write input/output (I/O) requests; and
    updating the at least one intermediate tree in accordance with the set of write I/O requests.

4. The method of claim 3, wherein the steps further include, subsequent to copying the first intermediate tree from the volatile memory to the non-volatile memory:
    creating a second intermediate tree in the volatile memory.

5. The method of claim 4, wherein the receiving, the updating, and the creating steps are iteratively performed until a number of intermediate trees stored in the non-volatile memory satisfies a count threshold.

6. The method of claim 1, wherein the steps further include:
    in response to determining that the first intermediate tree does not satisfy the first size threshold:
        tracking a size of the first intermediate tree until the first intermediate tree satisfies the first size threshold.

7. The method of claim 1, wherein merging the at least one intermediate tree with the base tree comprises:
    updating one or more records in the base tree in accordance with one or more changes recorded in the one or more records associated with the at least one intermediate tree.

8. The method of claim 1, wherein the steps further include:
    receiving a lookup request for a particular record; and
    searching the at least one intermediate tree to obtain the particular record.

9. A non-transitory computer readable storage medium configured to store instructions that, when executed by a processor included in a computing device, cause the computing device to merge one or more intermediate trees with a base tree, by carrying out steps that include:
    managing a first intermediate tree that is stored in a volatile memory with which the computing device is communicably coupled;
    in response to determining that the first intermediate tree satisfies a first size threshold:
        copying the first intermediate tree from the volatile memory to a non-volatile memory with which the computing device is communicably coupled, wherein the non-volatile memory:
            stores at least one intermediate tree that includes at least the first intermediate tree, and
            stores the base tree; and
    in response to determining that the at least one intermediate tree satisfies a second size threshold:
        merging the at least one intermediate tree with the base tree.

10. The non-transitory computer readable storage medium of claim 9, wherein the first intermediate tree satisfies the first size threshold when a size of the first intermediate tree matches or exceeds the first size threshold.

11. The non-transitory computer readable storage medium of claim 9, wherein the steps further include:
    receiving a set of write input/output (I/O) requests; and
    updating the at least one intermediate tree in accordance with the set of write I/O requests.

12. The non-transitory computer readable storage medium of claim 11, wherein the steps further include, subsequent to copying the first intermediate tree from the volatile memory to the non-volatile memory:
    creating a second intermediate tree in the volatile memory.

13. The non-transitory computer readable storage medium of claim 12, wherein the receiving, the updating, and the creating steps are iteratively performed until a number of intermediate trees stored in the non-volatile memory satisfies a count threshold.

14. A computing device configured to merge one or more intermediate trees with a base tree, the computing device comprising:
 a processor configured to cause the computing device to carry out steps that include:
  managing a first intermediate tree that is stored in a volatile memory with which the computing device is communicably coupled;
  in response to determining that the first intermediate tree satisfies a first size threshold:
   copying the first intermediate tree from the volatile memory to a non-volatile memory with which the computing device is communicably coupled, wherein the non-volatile memory:
    stores at least one intermediate tree that includes at least the first intermediate tree, and
    stores the base tree; and
  in response to determining that the at least one intermediate tree satisfies a second size threshold:
   merging the of at least one intermediate tree with the base tree.

15. The computing device of claim 14, wherein the first intermediate tree satisfies the first size threshold when a size of the first intermediate tree matches or exceeds the first size threshold.

16. The computing device of claim 14, wherein the steps further include:
 receiving a set of write input/output (I/O) requests; and
 updating the at least one intermediate tree in accordance with the set of write I/O requests.

17. The computing device of claim 16, wherein the steps further include, subsequent to copying the first intermediate tree from the volatile memory to the non-volatile memory:
 creating a second intermediate tree in the volatile memory.

18. The computing device of claim 17, wherein the receiving, the updating, and the creating steps are iteratively performed until a number of intermediate trees stored in the non-volatile memory satisfies a count threshold.

19. The computing device of claim 14, wherein the steps further include:
 in response to determining that the first intermediate tree does not satisfy the first size threshold:
  tracking a size of the first intermediate tree until the first intermediate tree satisfies the first size threshold.

20. The computing device of claim 14, wherein merging the at least one intermediate tree with the base tree comprises:
 updating one or more records in the base tree in accordance with one or more changes recorded in the one or more records associated with the at least one intermediate tree.

* * * * *

UNITED STATES PATENT AND TRADEMARK OFFICE
CERTIFICATE OF CORRECTION

| | |
|---|---|
| PATENT NO. | : 10,838,944 B2 |
| APPLICATION NO. | : 15/379429 |
| DATED | : November 17, 2020 |
| INVENTOR(S) | : Michael S. Mackovitch |

It is certified that error appears in the above-identified patent and that said Letters Patent is hereby corrected as shown below:

In the Claims

In Claim 1, Column 9, Lines 58-59: "determining that the of at least one intermediate" should read -- determining that the at least one intermediate --.

In Claim 14, Column 11, Line 23: "merging the of at least one intermediate" should read -- merging the at least one intermediate --.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*